United States Patent Office 3,280,154
Patented Oct. 18, 1966

3,280,154
5,6,7,8 - TETRAETHYL - ANTHRAQUINONE-1-CAR-
BOXYLIC ACID AND ITS 1-ANTHRAQUINONYL
AMIDE
Heinrich Hopff, Kusnacht, near Zurich, Walter Bolliger,
Zurich, and Arnold Wick, Basel, Switzerland, assignors
to J. R. Geigy A.G., Basel, Switzerland
No Drawing. Filed Dec. 17, 1962, Ser. No. 244,879
Claims priority, application Switzerland, Dec. 27, 1961,
14,994/61
2 Claims. (Cl. 260—368)

This invention relates to a process for the production of 5,6,7,8-tetraethyl-anthraquinone-1-carboxylic acid.

It has been found that the aforesaid tetraethyl-anthraquinone-1-carboxylic acid can be produced from o-(pentaethyl benzoyl) benzoic acid by cyclo-dehydrogenation and subsequent oxidation with strong oxidizing agents, for example with potassium dichromate, nitric acid, or manganese dioxide, in acid solution.

The process according to the invention can be illustrated by the following reaction diagram:

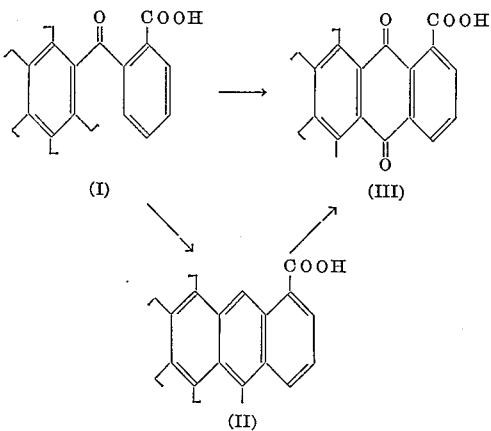

The starting material of Formula I, o-(pentaethyl benzoyl)-benzoic acid, is first refluxed with a chlorinating agent such as thionyl chloride until the development of hydrogen chloride is terminated, and then concentrated under vacuum, the residue is then dissolved in carbon disulfide or the like inert solvent conventional in Friedel-Crafts type reactions, and anhydrous aluminum chloride is then added. The mixture is left to react, then boiled under reflux, decomposed with ice-hydrochloric acid mixture and extracted with ether, and finally extracted with aqueous dilute alkali metal hydroxide solution.

The latter solution can be acidified and the intermediate of Formula II can be isolated, in a conventional manner, by extraction with ether and recrystallization from acetic acid ethyl ester and ligroin.

The intermediate product, or the aqueous alkaline solution containing the same is then further treated by preparing a corresponding aqueous solution, of the intermediate which is acidified by addition of a dilute mineral acid such as $H_2SO_4$ to an acidity corresponding at least to that of 40% $H_2SO_4$ and preferably 50% to 80% $H_2SO_4$, and refluxing of the latter solution with addition thereto of a strong oxidizing agent, preferably potassium dichromate, whereby the tetraethyl anthraquinone carboxylic acid of Formula III is obtained.

The above result is unexpected, for the use of o-(pentamethyl benzoyl) benzoic acid instead of the pentaethyl compound of Formula I, in the reaction with the same ring-closing reactants under similar conditions leads to the descarboxylation of o-(penta methyl benzoyl) benzoic acid and oxidation of the resulting intermediate affords only tetramethylanthraquinone.

The new ethyl anthraquinone carboxylic acid is useful in the production of acylamino-anthraquinone dyestuffs by condensation with aminoanthraquinones.

The following examples serve to illustrate the invention. Therein the temperatures are in degrees centigrade. Unless otherwise expressly indicated, the component parts are parts by weight.

Example 1

(a) 6 parts of 1-(pentaethylbenzoyl)-benzoic acid is boiled for 4 hours under reflux in 35 parts of thionyl chloride until no more hydrochloric acid is being produced, then liberated from excess thionyl chloride under reduced pressure, taken up several times in carbon disulphide and evaporated to dryness. The red-brown resinous residue is dissolved in 35 parts of carbon disulphide, and 4.50 parts of anhydrous aluminum chloride is added while stirring, whereby the colour changes to deep violet and spontaneous development of hydrochloric acid takes place with gentle boiling. The mixture is stirred for 3 hours and then boiled under reflux for an additional hour. It is then decomposed with a mixture of ice and hydrochloric acid, taken up in ether and the intensively fluorescent solution is extracted five times with 150 parts of 0.5 N sodium hydroxide solution. The resulting alkaline solution is then acidified with hydrochloric acid and the yellowish-brown crude product obtained therefrom by extraction with ether is recrystallized twice from ethyl acetate-ligroin. In this way, 2 parts of lemon-yellow needles as well as orange-yellow prisms having a melting point of 179° to 179.5° are produced. These needles are dried for 60 hours over phosphorous pentoxide at 70° in high vacuum. The structure of the compound is that of Formula II supra.

(b) 2 parts of the last-mentioned product, which is 5,6,7,8-tetraethyl-10-methyl-anthracene-1-carboxylic acid, are refluxed for 2 hours with 24 parts of potassium dichromate in 200 parts of glacial acetic acid. The glacial acetic acid is then evaporated off in vacuo and the residue is extracted with 0.5 N sodium hydroxide solution. The sodium salt of the acid separates out from the alkaline extracts in the form of small shiny flakes. On acidifying, the free acid is obtained therefrom and this crystallizes from ethyl acetate or glacial acetic acid into pale yellow crystals which melt at 240° C.

Example 2

4 parts 5,6,7,8-tetraethyl-anthraquinone - 1 - carboxylic acid, 16 parts by volume o-dichloro-benzene, 4.1 parts thionyl chloride and 0.1 part pyridine are heated in a round flask with reflux condenser to 120° and kept at 120–125° until no more hydrochloric acid develops and the formation of the carboxylic acid chloride is complete. The excess of thionyl chloride is then distilled off in vacuo together with some o-dichloro-benzene. The residue of the distillation is introduced into a reaction vessel, 2.23 parts 1-aminoanthraquinone and 20 parts o-dichloro-benzene are added and the mixture is stirred at 160–165° until the formation of the dye is complete. It is then heated, the product is filtered off and washed with o-dichlorobenzene and finally with ethanol. After drying, a yellow powder is obtained which is re-crystallized from nitro benzene. Its formula is

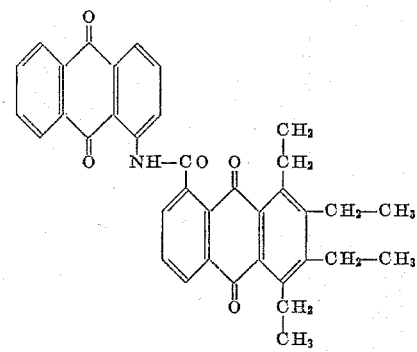

When, in the above example, 1-aminoanthraquinone is replaced by 5-benzoylamino-1-aminoanthraquinone, 6-chloroaminoanthraquinone, 7 - chloro - 1 - aminoanthraquinone, 6,7-dichloro-1-aminoanthraquinone or 5-benzoylamino-6-chloro-1-aminoanthraquinone, then dyestuffs having similar properties are obtained.

What we claim is:
1. A compound of the formula:

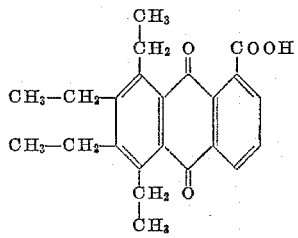

2. A dyestuff of the formula:

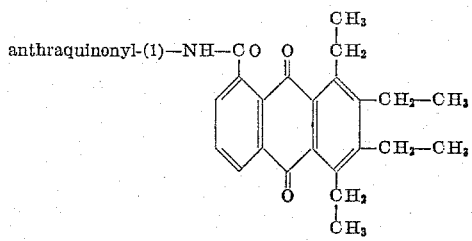

References Cited by the Examiner
UNITED STATES PATENTS

| | | | |
|---|---|---|---|
| 935,878 | 10/1909 | Wolman | 260—368 |
| 2,181,048 | 11/1939 | Deinet | 260—368 |

OTHER REFERENCES

Baddeley et al., "J. Chem. Soc." (London), 1952, pp. 2415–2420.

Hopff et al., "Helv. Chim. Acta," vol. 43, Nov. 17, 1960, pp. 1473–1481.

Houben, "Das Anthracen und die Anthraquinone," 1929, pp. 209–213.

Liebermann et al., "Ber. Deut. Chem.," vol. 8 (1875), pp. 246–249.

Oda, "Chem. Abstracts," vol. 34, pp. 3259–3260 (1940).

Wick, "Helv. Chim. Acta," vol. 45, Feb. 1, 1962, pp. 181–186.

LORRAINE A. WEINBERGER, *Primary Examiner.*

LEON ZITVER, *Examiner.*

R. K. JACKSON, *Assistant Examiner.*